Jan. 23, 1968   J. A. FEHR, JR., ET AL   3,365,537
WATERPROOF THRU-BOLT JOINT FOR JOINING ADJACENT
SECTIONS OF AN ELECTRIC POWER BUSWAY
Filed Aug. 5, 1966   3 Sheets-Sheet 2
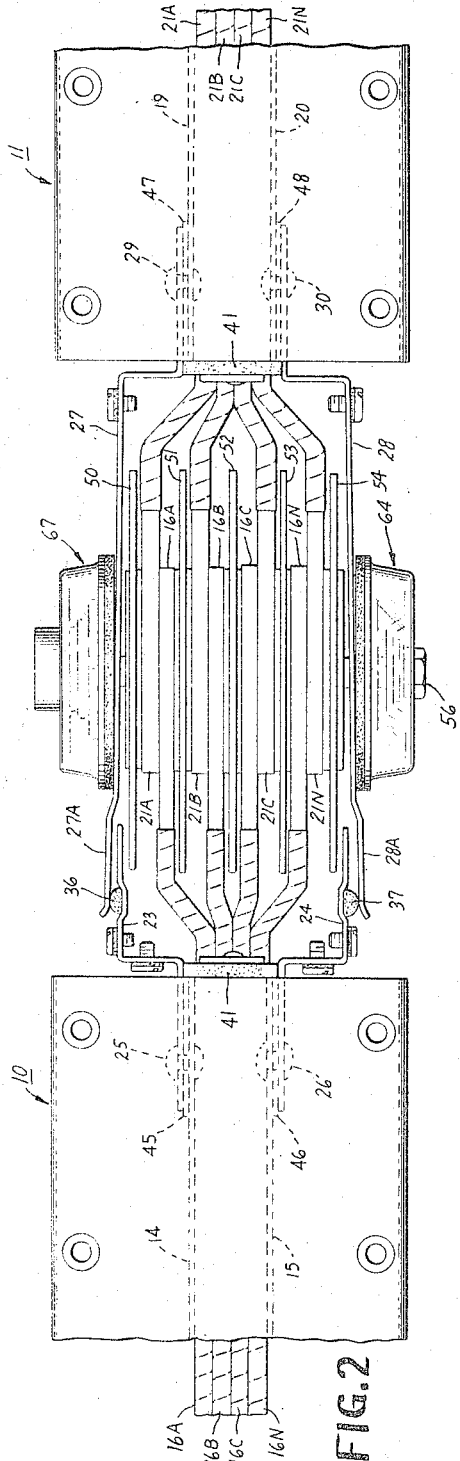
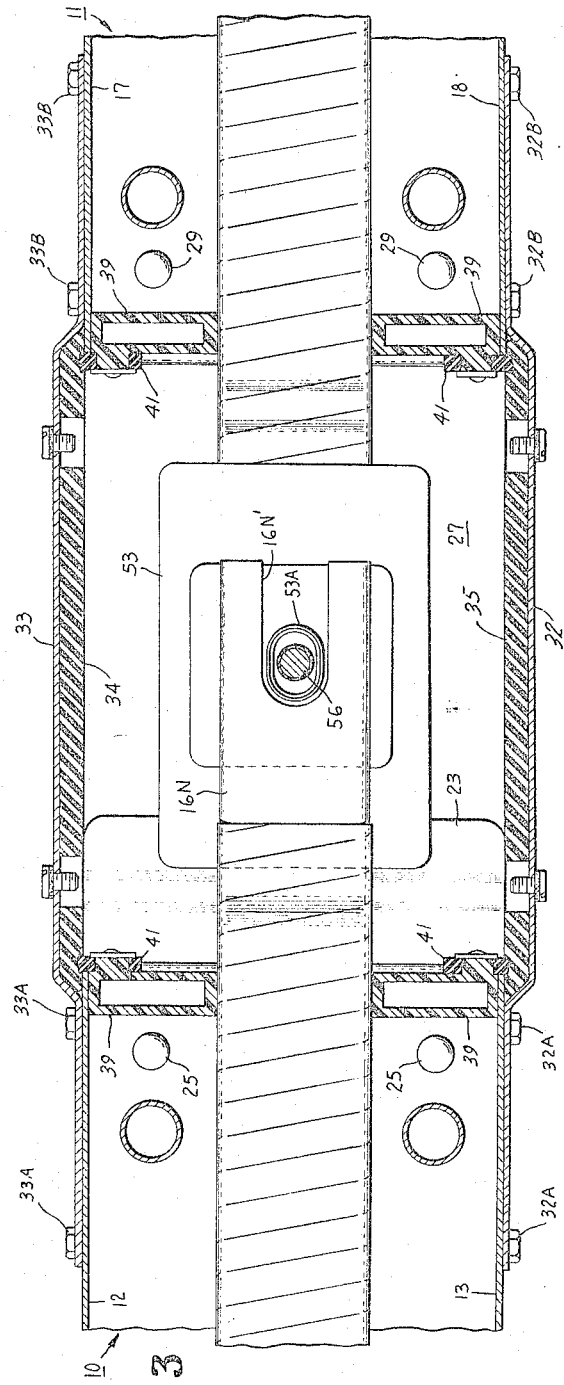
INVENTORS.
JOSEPH A. FEHR, JR.,
WERNER A. KRAUSE
BY Robert G. Casey
ATTORNEY

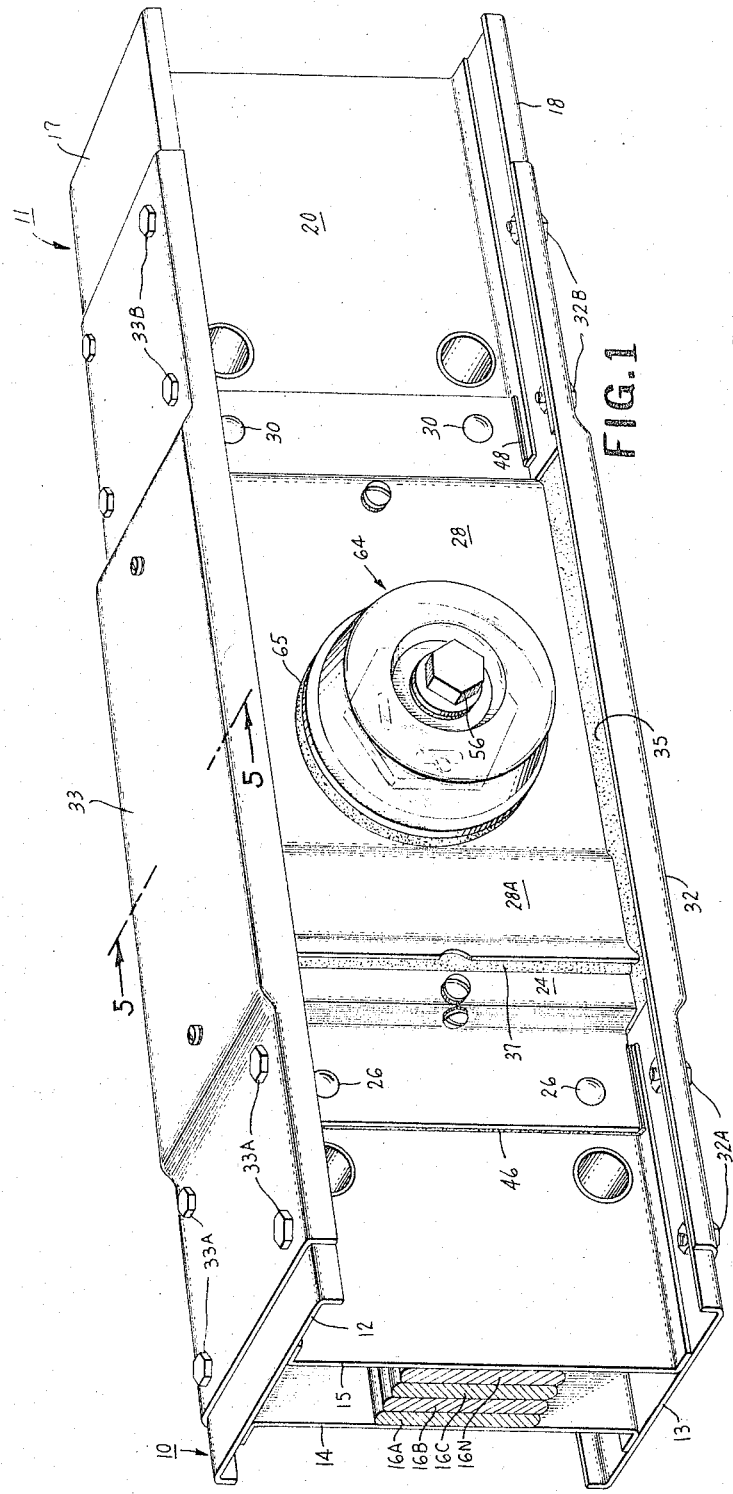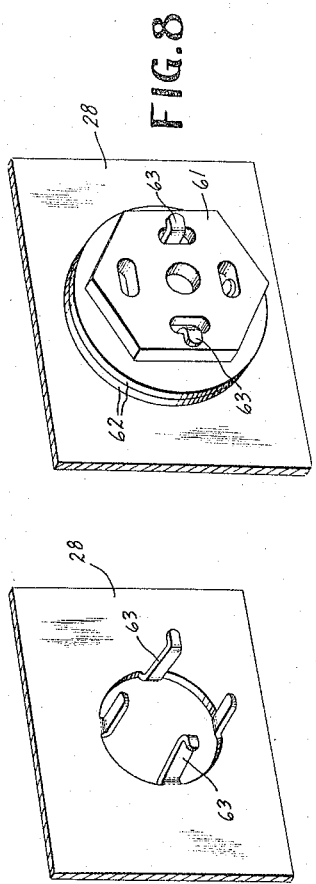

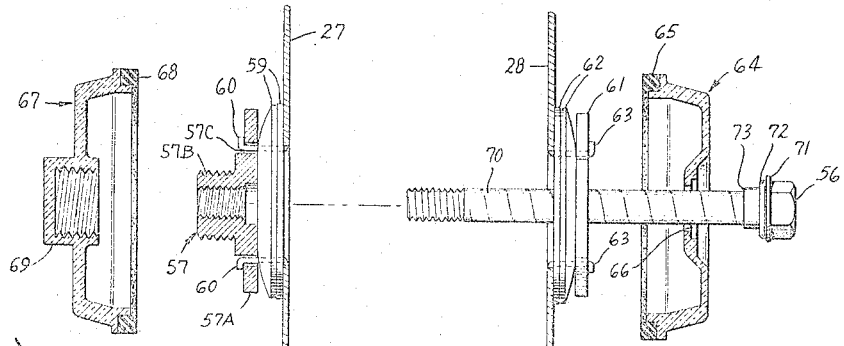
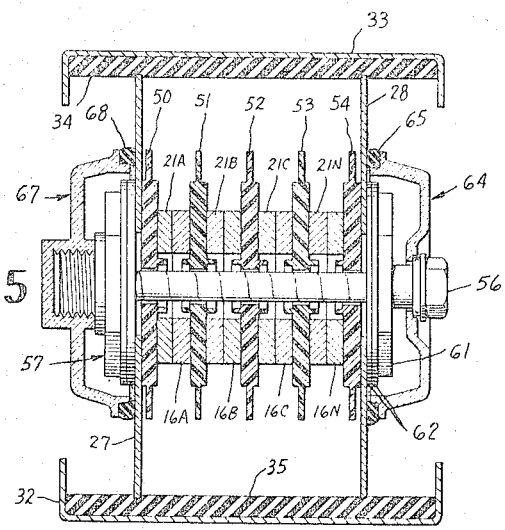
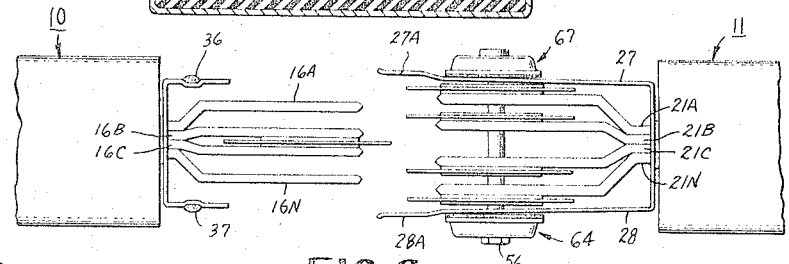
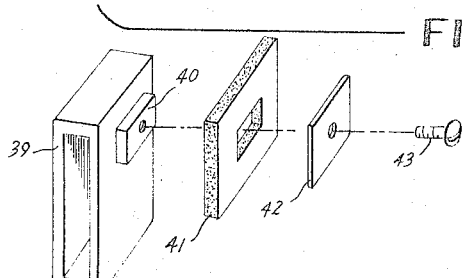

United States Patent Office 3,365,537
Patented Jan. 23, 1968

3,365,537
WATERPROOF THRU-BOLT JOINT FOR JOINING ADJACENT SECTIONS OF AN ELECTRIC POWER BUSWAY
Joseph A. Fehr, Jr., Simsbury, and Werner A. Krause, West Hartford, Conn., assignors to General Electric Company, a corporation of New York
Filed Aug. 5, 1966, Ser. No. 570,597
9 Claims. (Cl. 174—88)

ABSTRACT OF THE DISCLOSURE

Pressure is applied to overlapping bus bar ends at the joint between two sections of busway by means of a bolt which passes through the overlapped bus bar ends and the housing joint, and which has a pair of Belleville springs at either side of the joint housing. The bolt is provided with a pair of transparent bolt covers each of which carries a gasket. When compressed, these gaskets provide a watertight seal at the ends. Additional gaskets are also provided along the joint sides to make the entire joint watertight.

BACKGROUND OF THE INVENTION

(1) Field of the invention

Our invention relates to electric power busways of the type including an elongated metallic housing or duct and a plurality of rigid busbar conductors supported therein, and particularly to means for connecting ends of adjacent sections of such busways together.

(2) Description of the prior art

Electric power busways of the type described are often utilized in locations where they are exposed to the weather or to moisture from other sources, or to other liquids. If such moisture or other liquids enter the housing of the busway, they lower the over-surface dielectric resistance within the housing and can cause electrical failure or breakdown leading to destructive arcing, fire and other damage. In addition, such liquids may, of course, cause deterioration of materials within the housing.

Particularly severe problems as regards sealing such busways against the entrance of liquids are presented at the juncture of such sections which, unlike the intermediate housing structures, must be capable of being assembled on the location where the equipment is to be used. Also, since an important advantage of prefabricated busbar conductor systems or busways over cable or other distribution systems is their ability to be readily dismantled and reconnected in another location or configuration after initial installation, such joints must be capable of being disconnected and reconnected and be watertight when so reconnected.

A particular kind of multi-bar busway joint which is extremely simple to install and connect is the "single-bolt" joint since as the name implies, it requires the use of only a single bolt for connecting a plurality of pairs of busbars together. A single bolt type joint is shown, for example, in Patent 3,004,097 issued Oct. 10, 1961, and assigned to the same assignee as the present invention.

OBJECTS OF THE INVENTION

It is a general object of the present invention to provide a joint construction for an electric power busway system of the type including an elongated metallic duct and plurality of busbars therein which can be readily connected and which when connected will be substantially water-tight or "weatherproof" to prevent the entrance of water or other undesirable liquids into the busway joint.

It is a further object of the invention to provide a busway joint which is watertight or "weatherproof" and which also requires the use of only a single bolt.

It is a further object of the invention to provide a weatherproof joint of the single bolt type which is so constructed and arranged that it is possible for the observer to tell by looking at it whether it is properly tightened.

SUMMARY OF THE INVENTION

In accordance with the invention, an electric power busway is provided including an elongated metallic duct or housing and a plurality of relatively wide thin flat busbars supported therein in flatwise spaced alignment. The ends of the busbar conductors project from the housing and are arranged to overlap and interleave with corresponding busbar ends of another housing section. Relatively wide thin flat insulating plates are attached to the sides of the busbar ends to insulate each pair of overlapped busbar ends from the adjacent pair. The assembly of overlapped ends is clamped together by a single bolt passing transversely through all of said overlapped ends. In accordance with the invention, a pair of generally bowl-shaped or cup-shaped insulators or shields are provided on the outer side wall of the joint assembly over the ends of the clamping bolt. The aforesaid shields are, moreover, provided with resilient gasketing means at the edge thereof which presses against and makes a watertight seal against the side of the housing as the clamping bolt is tightened. In accordance with the invention, means is also provided for limiting the compressive force which can be exerted on the shields to avoid breakage thereof, although the clamping bolt must exert very much higher pressures on the overlapped busbar ends in order to properly connect them.

In accordance with another aspect of the invention, the aforesaid shields are made of transparent material so that the user can observe the compressive condition of the spring means to be clamped by the bolt to ascertain that the joint has been sufficiently tightened. This is desirable for safety reasons, since a joint connection of this type which is put together but not sufficiently tightened can cause excessive heating which can lead to destruction of the insulating material and possible electrical failure.

In accordance with another aspect of the invention, means is provided for connecting the busway housing ends and for making a watertight seal between them, which sealing means is also clamped into sealing condition by the tightening of the single clamping bolt, in combination with top and bottom housing covers.

The invention will be more fully understood from the following detailed description, and its scope will be pointed out in the appended claims.

BRIEF DESCRIPTION OF THE DRAWING

In the drawings:
FIGURE 1 is a perspective view of a joint between two busbar sections, constructed in accordance with the invention;
FIGURE 2 is a plan view, with the housing top and bottom covers removed, of the joint construction shown in FIGURE 1;
FIGURE 3 is a side elevation view, partially in section, of the apparatus of FIGURE 2;
FIGURE 4 is an exploded fragmentary view of the clamping bolt and associated parts utilized in the joint construction of FIGURE 1;
FIGURE 5 is a sectional view of the busbar joint construction shown in FIGURE 1, taken substantially on the line 5—5 of FIGURE 1;

FIGURE 6 is an illustration of the joint construction of FIGURE 1 in a separated condition, the top and bottom joint covers being omitted for clarity;

FIGURES 7 and 8 are fragmentary perspective views of portions of the apparatus of FIGURE 1, and FIGURE 9 is an exploded perspective view of a component sub-assembly of the joint construction of FIGURE 1.

DESCRIPTION OF A PREFERRED EMBODIMENT

Referring to FIGURE 1, the invention is shown as incorporated in electric power busway apparatus comprising a joint construction interconnecting a pair of busway sections 10 and 11 respectively. The busway section 10 includes a pair of generally channel-shaped top and bottom members 12 and 13, respectively, interconnected by a pair of generally channel-shaped side members 14 and 15 respectively. A plurality, in this case four, insulated busbars 16A, 16B, 16C and 16N, are supported by suitable insulating means, not shown, within the housing defined by the top and bottom and cover plates 12 and 13 and side plates 14 and 15. Similarly, the busway section 11 comprises top and bottom plates 17 and 18 interconnected by side plates 19 and 20, and containing busbars 21A, 21B, 21C, 21N respectively.

Referring now, particularly to FIGURES 1 and 6, the top and bottom plates 12, 13 and 17, 18, of the respective sections 10 and 11 respectively, are discontinued short of the joint location. The side walls 14 and 15 of the section 10 are, however, extended slightly by extensions 23 and 24 respectively, attached to the housing side walls by suitable means such as by welding or by rivets 25, 26, respectively. Likewise, the side walls 19 and 20 of the section 11 are extended by relatively longer extensions 27, 28, attached to the side walls 19 and 20 by suitable means such as by rivets 29, 30. The side extensions 27 and 28 extend beyond the joining portion of the joint and terminate in outwardly directed end portions 27A, 28A for a purpose to be described.

The housing bottom walls 13 and 18 of the busway sections 10 and 11 respectively are interconnected by a bottom joint cover plate 32 connected to the bottom plate 13 by suitable means such as by bolts 32A and to the bottom plate 18 of the section 11 by suitable means such as by bolts 32B. A top cover plate 33 is likewise provided connected to the corresponding top plates 12 and 17 of the sections 10 and 11 respectively by suitable means, for example, as bolts 33A and 33B respectively. The intermediate portions of the top and bottom joint cover plates 32 and 33 carry a cushion member of resilient gasketing material 34 and 35 respectively, for a purpose to be described.

A strip of resilient gasketing material 36, 37 of the type previously described, is attached to each of the side extensions 23 and 24. When the housing sections are brought together in the assembled condition as indicated in FIGURE 2, the outwardly flared portions 27A, 28A of the side extensions 27 and 28 overlap the side extensions 23, and 24, and engage the gasket strips 36, 37 respectively, so that when the joint is clamped together, in a manner to be described, these surfaces provide a watertight seal for the side walls. Likewise, when the top and bottom cover plates 32, 33 are assembled, the upper and lower edges of the side extensions 23, 27 and 24, 28, press into the resilient gasketing material 34, 35, as shown in FIGURE 5, to provide watertight seals at the juncture between the top wall and the side walls. The end walls of the generally boxlike enclosure for the joint are also sealed in a watertight manner by the cooperation of the gasketing material 34, 35, pressed against the laterally offset portions of the side extensions 23, 24 and 27, 28. In the space between the aforesaid laterally offset portions of the side wall extensions supplementary gasketing means is provided. This gasketing arrangement, which is shown in exploded perspective form in FIGURE 9, comprises a supporting block of insulating material 39 supported in the space between the side walls 14, 15 and between the busbar conductors and the top wall. The insulating block 39 has a raised portion 40 on which is supported a rectangular frame shaped gasket member 41. The gasket member 41 is held on the boss 40, and is tightly compressed thereagainst by a retaining plate 42 held to the block 39 by suitable means such as by the screw 43. Four of such gasketing assemblies are used, two on each busway section end. When the top and bottom cover plates 32, 33, are assembled, the gasketing material 34 and 35 is pressed against the gasketing material 41 at each of the four locations described.

Between the side extensions 23, 24 and the corresponding side walls 14, 15, of the housing of section 10, there is provided a sheet 45, 46, of resilient gasketing material (see FIG. 2). Likewise, between the side wall extensions 27, 28 and the corresponding side walls 19, 20, of the housing of section 11, a similar pair of sheets of gasketing material 47, 48 is also provided.

The ends of the busbars 16A, 16B, 16C, and 16N, are outwardly offset, and the ends of the busbars 21A, 21B, 21C, and 21N of the section 11 are also outwardly offset so as to overlap as shown in FIGURE 2 when the busway sections are brought together. The overlapped busbar ends are insulated from each other by generally rectangular platelike rigid insulators 50–54, each attached to one of the busbars 21A, 21B, 16C, 21C, and 21N, respectively, see for example, FIGURE 6. The busbar ends 21A–21N are provided with holes, and the busbar ends 16A–16N are provided with slots such as 16N', FIGURE 3, for the purpose of receiving a clamping bolt 56 which passes through the complete assembly comprising the side wall extensions 27, 28, insulators 50–54, and overlapped busbar ends, to clamp the busbars together. It will thus be apparent that pressure by the bolt on the side wall extensions 27, 28, urging them inwardly toward each other will compress the flange portions 27A, 28A of the extensions 27, 28, against the gasket strips 36, 37 of the extensions 23, 24 as previously described. Thus entrance of moisture by way of the housing connections is effectively prevented.

In accordance with another important aspect of the invention, the clamping bolt 56 is provided with means which prevents the entrance of moisture around the openings provided for the bolt. This aspect of the invention is particularly clearly illustrated in FIGURES 4 and 5. As shown in these figures, the side wall extension 27 is provided with a retaining nut 57 having a base or flange portion 57A and a threaded neck portion 57B. A pair of spring washers or "Belleville" 59 are positioned between the retaining nut 57 and the side wall 27. The nut 57 and the washers 59 are retained by suitable means allowing motion between the nut 57 and the side wall 27, such, for example, as by means of integral strip-like portions or tangs 60 formed out of the material of the side wall 27 and extending through the central openings of the washers 59 and through openings 57C in the retaining nut 57. The neck portion 57B is externally and internally threaded for purposes to be described.

A pressure plate is provided at the outside of the side extension 28, and a pair of spring washers 62 are provided between the pressure member 61 and the side extension 28. The pressure plate 61 and washers 62 are retained in position by integral strip portions or tangs 63 formed from the material of the side extension 28, and extending through openings in the pressure plate 61 and through the central opening of the spring washers 62, whereby the pressure plate is movable toward and away from the sidewall 28.

A generally cup-shaped insulating shield 64 is provided, having a ring of resilient gasketing material 65 attached to the edge portion thereof by suitable means such as by fitting over a shouldered portion and being bonded thereto. The shield member 64 has an opening therein 66 to permit passage of the shank of the clamping bolt 56. A second generally cup-shaped insulating shield member 67 is provided for covering the retaining nut 57, and having a ring-shaped resilient gasket material 68 on the edge thereof. The shield 67 includes a central internally threaded hub portion 69 which is adapted to be received in threaded relation on the external threads of the neck portion 57B of the retaining nut 57.

The clamping bolt 56 has the main intermediate portion thereof shielded by an insulating covering 70. The clamping bolt 56 has a flange portion 71 adjacent the head thereof, and a ring of gasketing material 72 positioned adjacent said flange. The bolt 56 also has an enlarged portion forming a shoulder 73 for a purpose to be described.

It will now be apparent by reference to FIGURE 5 that following the interengagement of the two busway sections to be connected so that their exposed busbar ends are brought into overlapping relation as indicated in FIGURE 2, the clamping bolt 56 may now be tightened.

The parts shown in FIGURE 4, comprising the retaining nut 57, spring washers 59, pressure plate 61 and spring washers 62, clamping bolt 56 and insulating shields 67 and 64, are all normally carried by one busway section, such as section 11 shown in FIGURES 1–3. Assembly of two sections is therefore readily accomplished by bringing two busway sections into overlapped interengagement in the condition shown in FIGURE 2, but with the clamping bolt 56 still in loosened relation although partially engaged in the clamping nut 57. When the parts are brought into full engagement, such interengagement is limited by the engagement of the end of the slots 16N′ with raised formations 53A on the rectangular insulators 53, see FIG. 3. The only steps necessary to complete the connection of the watertight joint are to tighten the clamping bolt 56, and to then attach the top and bottom cover plates 32, 33.

As the clamping bolt 56 is tightened, it draws the retaining nut 57 against the side walls 27, and the pressure plates 61 against the side walls 28, until the spring washers 59 and 62 are compressed to the completely flattened condition as indicated in FIGURE 5. Excessive strain on the shield member 67 is prevented by so dimensioning this part and its gasketing material 68 that when the retaining member 67 is moved to its final position as shown in FIGURE 5, with the spring washers 59 completely flattened, only the desired amount of compressive force is exerted thereon such as is desired to hold the gasket member 68 in sealing relation to the side wall 27.

For the purpose of permitting visual inspection to verify that the washers 59, 62 are completely flattened, indicating that the required amount of pressure has been applied to the busbars, the shield members 64 and 67 are preferably made of transparent acrylic or polycarbonate material. If desired, the shield members 64, 67 may be of metallic material, although in such case the visual inspection feature would not be provided.

In addition, means is provided for preventing the exertion of excessive strain on the shield member 64. This means comprises the shoulder 73 which engages the pressure plate member 61 and transmits compressive force to the assembly. It will be obvious that the spacing between the flange member 71 and the side wall 28 is limited by the engagement of the shoulder 73 with the pressure plate 61 so that when the spring washers 62 are in the flattened condition, the flange 71 reaches a limiting position with respect to the side wall 28. The dimensions of the sheet member 64 and the gasketing members 65 and 72 are selected so that when the flange member 71 is in this position, only the desired compressive force is exerted which is necessary to produce the desired watertight seals between these gasket members and the shield member 64 and the sidewall 28 respectively. Accordingly, there is no danger of breaking either of the shields 67 or 64 by excessive tightening of the bolt 56. It will be observed, however, that by proper dimensioning of the length of the bolt 56 and the length of the neck portion 57B of the nut 57 with its internal threads, as much pressure may be exerted on the overlapped busbar ends as is desired or can be tolerated by the strength of the materials of the bolt, the spacing insulators, and the busbars.

While the invention has been described in only one particular embodiment, it will be readily apparent that many modifications thereof may readily be made, and we therefore intend by the appended claims to cover all such modifications as fall within the true spirit and scope of the invention.

What we claim as new and desire to secure by Letters Patent of the United States is:

1. Electric power busway apparatus comprising:
   (a) a first set of relatively wide, thin, flat busbar conductors supported in spaced-apart relation in a row;
   (b) a second set of relatively wide, thin, flat busbar conductors supported in spaced-apart relation in a row;
   (c) said first set of busbar conductors having end portions thereof substantially in alignment with corresponding end portions of said busbar conductors of said second set;
   (d) busbar connecting means electrically interconnecting said busbar conductors of said first set to corresponding ones of said busbar conductors of said second set;
   (e) a pair of generally planar rigid side wall members at opposite sides of said busbar conductor ends;
   (f) at least one clamping bolt extending through an aperture in at least one of said wall members;
   (g) said clamping bolt having a first shoulder acting on said one wall member and urging said one wall member toward the other of said wall members and exerting pressure on said busbar connecting means;
   (h) said clamping bolt having a second shoulder thereon spaced a predetermined distance from said first shoulder at the outer side of said one wall member;
   (i) a generally cup-shaped shield member carried by said bolt at said outer side of said one wall member and having edge portions thereof engaging said one wall member, said second shoulder of said clamping bolt engaging said shield member and urging said shield member toward said one wall member;
   (j) the dimension of said shield member being such with respect to said predetermined distance of said second shoulder from said first shoulder that the force exerted by said bolt on said shield member when said first shoulder is in engagement with said one wall member is limited to an amount less than the amount required to break or deform said shield member.

2. Electric power busway apparatus as set forth in claim 1, said apparatus also including resilient spring means between said first shoulder and said one wall member, said shield member being constructed of transparent material, whereby the condition of said resilient spring means may be viewed when said bolt is in tightened condition.

3. Electric power busway apparatus as set forth in claim 1 wherein said clamping bolt extends through both of said wall members, said apparatus also comprising a retaining nut at the outer side of said other wall member opposite said one wall member, said clamping bolt extending into threaded engagement with said retaining nut.

4. Electric power busway apparatus as set forth in claim 1 said apparatus also comprising:
   (a) first gasket means supported between said edge portions of said shield member and said outer side of said one wall member and second gasket means between said second shoulder on said bolt and said shield member, said first and second gasket means preventing passage of liquids through said one wall member by way of said aperture provided for said clamping bolt.

5. Electric power busway apparatus comprising:
 (a) an assembly of busbar end portions;
 (b) means electrically interconnecting said busbar end portions;
 (c) first and second wall members disposed at opposite sides of said assembly of busbar end portions;
 (d) clamping means exerting pressure on said interconnecting means, said clamping means comprising a clamping bolt extending through said assembly of busbar end portions and through said first and second wall members;
 (e) said clamping bolt having a head portion at the outer side of said first wall member;
 (f) a retaining nut at the outer side of said second wall member;
 (g) sealing means preventing the entry of liquid through said first wall member through the opening therein provided for said clamping bolt, said sealing means comprising a generally cup-shaped shield member having an aperture therein through which said bolt extends;
 (h) a first shoulder on said clamping bolt engaging said first wall member, a second shoulder on said clamping bolt engaging said shield member, said first and second shoulders being spaced apart a distance as sufficient to create clamping pressure on said shield member to said shield member into sealing engagement with said first wall member and to prevent the exertion of excess force thereon;
 (i) means preventing the entry of moisture through said opening provided for said bolt adjacent said retaining nut comprising a generally cup-shaped shield member carried by said retaining nut;
 (j) means mounting said shield member on said retaining nut, said shield member being dimensioned so that the edges thereof normally extend beyond said retaining nut, whereby said shield member is compressed against said second wall member with only a predetermined amount of pressure.

6. Electric power busway apparatus comprising:
 (a) a first busway section comprising a first set of electric power busbar conductors;
 (b) a second busway section comprising a second set of electric power busway conductors;
 (c) said second set of busbar conductors extending in endwise aligned juxtaposed relation to said busbar conductors of said first set;
 (d) means electrically interconnecting said first and second sets of busbar conductors, said connecting means including a clamping bolt extending through said assembly of electrically interconnected busbar conductors;
 (e) watertight housing means comprising a pair of opposed side wall members carried by one of said busway sections, said side wall members being resiliently movable toward and away from each other;
 (f) a pair of side wall abutments carried by the other of said busway sections, said side wall members of said one busway section at least partially overlapping said side wall abutments of said other busway section;
 (g) resilient gasket means between said overlapping portions of said side wall members and said side wall abutments;
 (h) said clamping bolt also extending through said side wall members and clamping said overlapping portions of said side wall members against said side wall abutments as said electrically interconnecting means is clamped by said clamping bolt.

7. Electric power busway apparatus as set forth in claim 6, said side wall members having upper and lower edge portions, said apparatus also comprising:
 (a) top and bottom joint cover members;
 (b) resilient gasket material carried by said top and bottom joint cover members;
 (c) fastening means drawing said joint cover members toward said assembly of busbar conductors and pressing said resilient gasket material onto said upper and lower edge portions of said side wall members.

8. Electric power busway apparatus as set forth in claim 7, said apparatus also including resilient gasket means extending in a direction transversely of said busbar conductors above and below said busbar conductors at each end of the joint assembly, said gasket material carried by said top and bottom cover members engaging said transversely extending gasket material whereby to provide a completely watertight generally box-like enclosure for said joint assembly.

9. Electric power busway apparatus as set forth in claim 8, said apparatus also comprising a pair of generally cup-shaped sealing members one at the outer side of each of said side wall members, said cup-shaped members being drawn into sealing engagement with said side wall members when said clamping bolt is tightened.

References Cited
UNITED STATES PATENTS

| | | | |
|---|---|---|---|
| 3,004,097 | 10/1961 | Johnston et al. | 174—88 |
| 3,187,086 | 6/1965 | Moodie et al. | 174—68 |
| 3,189,680 | 6/1965 | Stanback | 174—88 |

LARAMIE E. ASKIN, *Primary Examiner.*